ated Statesatent

Cornelius

[15] 3,665,722
[45] May 30, 1972

[54] METHOD AND APPARATUS FOR MAKING A PARTIALLY FROZEN BEVERAGE

[72] Inventor: Richard T. Cornelius, Minneapolis, Minn.
[73] Assignee: The Cornelius Company, Anoka, Minn.
[22] Filed: Sept. 29, 1970
[21] Appl. No.: 76,402

[52] U.S. Cl. ........................................62/68, 62/177, 62/348
[51] Int. Cl. ..............................................F25c 7/10
[58] Field of Search ..................222/54; 62/392, 177, 68, 66, 62/348

[56] References Cited

UNITED STATES PATENTS

| 3,159,007 | 12/1964 | Rahauser et al. | 62/348 X |
| 3,319,436 | 5/1967 | Wilch | 62/68 |
| 2,745,641 | 5/1956 | Jacobs | 62/392 X |
| 3,045,441 | 7/1962 | Patch et al. | 62/68 |

*Primary Examiner*—William E. Wayner
*Attorney*—Hill, Sherman, Meroni, Gross & Simpson

[57] ABSTRACT

A method and apparatus by which liquid stored in a storage chamber passes through a filling line to a freezing chamber from which it is dispensed. The liquid in the storage chamber is continuously circulated by a circulation pump to withdraw liquid therefrom and to return it through a standpipe having a restricted outlet. When the temperature in the storage chamber increases to a predetermined point, such temperature is sensed to cause a valve to open in a return line that leads from the freezing chamber to the storage chamber whereby liquid in the storage chamber is partially replaced by refrigerated liquid which may include ice particles from the freezing chamber.

20 Claims, 1 Drawing Figure

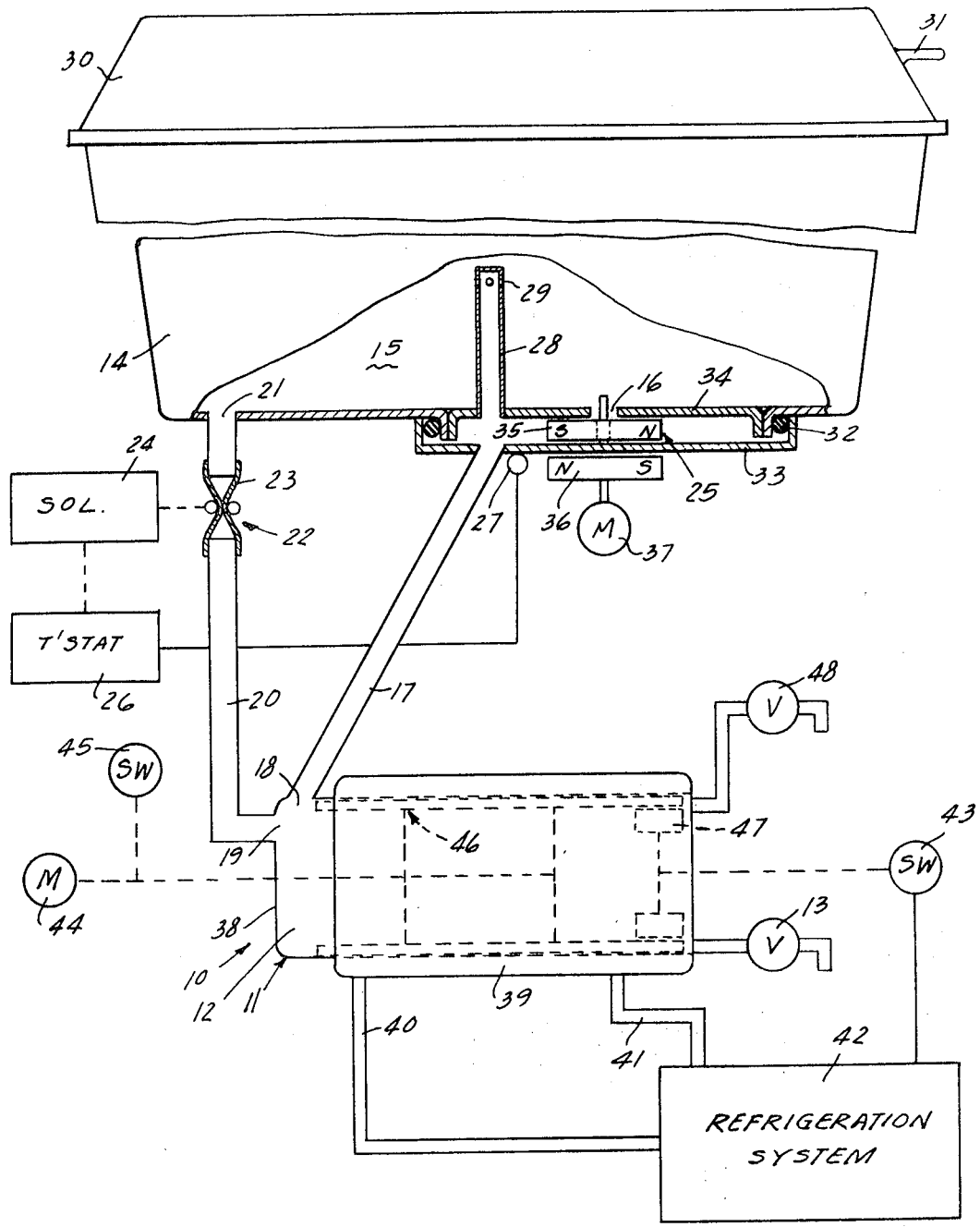

METHOD AND APPARATUS FOR MAKING A PARTIALLY FROZEN BEVERAGE

BACKGROUND OF THE INVENTION

1. Field of the Invention

This invention relates to an apparatus for partially freezing a liquid and dispensing it as an edible or potable product, including the method for doing so.

2. Prior Art

It has been known heretofore to connect a storage chamber with a freezing chamber by a single pipe of substantial diameter so that ice particles may float upwardly therethrough while at the same time liquid may flow by gravity downwardly therethrough to replenish product dispensed from the freezing chamber. Such an arrangement provides no control for the degree of cooling of liquid that takes place in the storage chamber, and such an arrangement inherently has in the freezing chamber a pressure that varies in accordance with the height of the liquid in the storage chamber. Such pressure variation cannot be tolerated in a coin-operated machine where the amount of product dispensed is controlled by a timer.

SUMMARY OF THE INVENTION

The dispensing apparatus is constructed to include a filling line leading from the storage chamber to the freezing chamber, a return line leading from the freezing chamber to the storage chamber, a valve controlling the flow of liquid through the return line, a circulating pump arranged to positively fill the freezing chamber, and to circulate product from the storage chamber through the freezing chamber and back to the storage chamber, and also to circulate product from the storage chamber directly back to the storage chamber, the latter circulation being through a stand-pipe that has a restricted outlet for providing a back pressure at the outlet of the pump that insures a constant dispensing pressure in the freezing chamber.

Accordingly, it is an object of the present invention to provide a method and apparatus for refrigerating a liquid and for dispensing it as an edible or potable product.

Another object of the present invention is to provide a device of the type described having a liquid storage chamber above and connected to a freezing chamber wherein the pressure in the freezing chamber is constant for any level of liquid in the storage chamber.

Another object of the present invention is to provide positive circulation means between a storage chamber and a freezing chamber for effecting cooling of the liquid in the storage chamber.

A still further object of the present invention is to provide for a positive control of temperature in the storage chamber by means of thermostatically regulating circulation therebetween.

Another object of the present invention is to provide a freezing chamber that is pressurized hydrostatically without use of any source of compressed gas.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWINGS

The single FIGURE is a diagrammatic view, not to scale, of a device for refrigerating a liquid and for dispensing it as an edible or potable partially frozen product.

AS SHOWN ON THE DRAWINGS

This invention is particularly useful when embodied in a refrigerated dispenser for producing and dispensing semi-frozen products such as illustrated diagrammatically in the drawing and indicated generally by the numeral 10. The device includes a means 11 having a freezing chamber 12 for partially freezing the potable or edible liquid which is dispensed therefrom by a dispensing valve 13. The liquid is supplied to the freezing chamber 12 from a supply vat 14 having a storage chamber 15 disposed above the freezing chamber 12. Liquid in the storage chamber 15 passes through a first point or opening 16 and through a filling line 17 to the freezing chamber 12. Thus, the liquid in the storage chamber produces a head pressure in the freezing chamber that assists in the dispensing of the product through the valve 13. The filling line 17 enters the freezing chamber 12 at a first point or opening 18, and at a point 19 remote therefrom, a return line 20 is connected to receive liquid from the freezing chamber 12 and to return it to a second point or opening 21 leading to the storage chamber remotely from the point 16, there being a valve 22 in the return line 20. The valve 22 comprises a section of flexible tubing 23 which preferably is an elastomer, and the valve 22 is normally closed. To this end, the tubing is normally pinched flat as shown, and the valve 22 further includes a solenoid actuator 24.

To cool the liquid in the storage chamber 15, there is provided a pump 25, the inlet of which is connected to the point 16 in the storage chamber and the outlet of which is connected to discharge into the filling line 17. With the valve 22 open, liquid is thus circulated through the filling line 17 and the return line 20, and in being so circulated, it is refrigerated and/or replaced by liquid which normally contains ice particles in the freezing chamber 12.

Means are provided that are responsive to the temperature of the stored liquid for controlling the valve 22 and the return line 20. To this end, a thermostat 26 is electrically connected to the solenoid 24 of the valve 22, and the thermostat 26 has a sensing element 27 that is disposed adjacent to the outlet of the pump 25 for sensing the temperature of the stored liquid in the storage chamber 15. A typical setting for the thermostat 26 is for it to energize the solenoid 24 for opening the valve 22 when the temperature in the chamber 15 is about 40F, and for closing the valve 22 when the temperature of the liquid in the chamber 15 is about 38F. As the temperature is indirectly sensed, the actual settings of the thermostat are correspondingly compensated.

The pump 25 runs continually, and it also discharges to the lower end of a standpipe 28. The standpipe 28 may be a vertical extension of the filling line 17 so that both the upper end of the filling line 17 and the lower end of the standpipe 28 communicate directly with the outlet of the pump 25. The upper end of the standpipe 28 discharges within the storage chamber 15 and is of such construction as to provide a back pressure that will augment the head pressure produced by the liquid. For example, the standpipe may extend above the level of the liquid. However, preferably, the upper end of the standpipe 28 is partially restricted as at 29. In this construction, the uppermost end is totally closed and a series of openings are provided which jointly act as a restrictive orifice. The back pressure thus provided by the restricted standpipe 29 is continually present at the upper end of the filling line 17 for any level of liquid in the storage chamber 15 whereby a constant pressure is provided in the freezing chamber 12 at all times. Thus, by this arrangement, even though a storage vat is utilized, the pressure in the freezing chamber 12 is not dependent on liquid level in the storage chamber 15. The arrangement at the upper end 29 of the standpipe 28 has two additional advantages. The product does not impinge against the cover, and therefore heat losses are substantially reduced and the device operates thermally somewhat more efficiently. The second advantage is that the cover may be removed for the purpose of adding liquid to the storage chamber 15 while the pump is running without there being any danger of product being pumped out of the chamber 15. Thus, the pump 25 provides continuous circulation of product within the storage chamber 15 so that the sensing element 27 at all times senses a representative sampling of liquid. Further, the product is kept in motion which serves as a feature having eye-appeal to a point-of-purchase buyer of the product. The supply vat 14 typically comprises transparent material and if desired may be of a tinted color representative of a particular flavor. The cover of the supply vat 14 is identified at 30 and may include a handle 31. The supply vat 14 has a flanged opening at its bottom which has a seal 32 with a housing element 33 of the pump 25, the opening being further closed by a further housing element 34 of the pump 25 that contains the inlet 16 and which supports the standpipe 28.

The pump 25 is of known construction and has an impeller 35 containing permanent magnets that are rotated by a revolving magnetic field provided by a magnet 36 driven by a motor 37.

The means 11 for partially freezing the liquid includes a cylinder 38, the interior of which comprises the freezing chamber 12. Surrounding the freezing chamber 38, there is a heat exchanger 39 which communicates by means of refrigeration lines 40 and 41 with a refrigeration system 42 that is under the control of a switch 43. A motor 44 operates continuously through a pulley (not shown) which has a centrifugal switch 45 connected in the motor circuit. Should the belt break, the device is shut down electrically by the switch 45. The motor 44 is connected through a seal (not shown) to rotate a scraper assembly 46 within the freezing chamber 12 for removing ice particles from the interior wall of the cylinder 38. As the quantity of ice increases in the freezing chamber 12, its consistency thickens and such consistency change is sensed by a spring-loaded element 47 which is connected to the actuator of the switch 43. A valve 48 is provided to enable filling of the chamber 12 with liquid. The details of the freezing means 11, except for the dual apertures 18, 19, do not form a part of this invention but have been described for completeness, and for the convenience of the reader.

The apertures 29 in the standpipe 28 typically have a size on the order of one-eight inch to one-four inch diameter, and the pressure in the freezing chamber 12 for various embodiments of this invention typically falls in the range of ½ to 2 p.s.i. The spacing between the openings 16 and 21 in the supply vat 14 is sufficient to insure that there will be good mixing of the refrigerated product as it enters at the point 21. In typical operation, the product in the freezing chamber 12 will be about 30 to 50 percent ice and will typically have a temperature between 26 and 28F. This ratio is applicable to typical quantities of sugar present in the liquid, or other equivalent freezing point depressant. Thus, no refrigeration is provided to the supply vat 14, but its contents are kept cool. Such cooling takes place even when there may be no demand for product to be dispensed through the dispensing valve 13, and thereby the freezing chamber 12 is not only given a reserve of added supply capacity, but is also given a reserve of added refrigeration capacity. Typical liquids that are treated are those normally found or sold as slush-type of drinks wherein sugar forms an ingredient. A further typical type of liquid that is used is fruit juice and fruit juice drinks, which contain natural sugars.

By virtue of the fact that forced circulation is present for both cooling the liquid in the storage chamber 15 and for refilling the freezing chamber 12, liquids containing pulp can be readily handled without danger of clogging. By the continuous operation of the circulating pump 25, a constant head is provided in the freezing chamber 12 irrespective of the liquid level in the storage chamber, and a continuous sampling for temperature control coupled with eye-appealing circulation is effected. By this arrangement, reliability is provided so that the dispensing valve 13 may be electrically operated when the disclosed system forms part of a coinoperated machine.

The embodiment described therefore includes the steps of partially freezing a quantity of the liquid in the chamber 12, and in accordance with demand at the dispensing valve 13, dispensing partially frozen product from the chamber 12. Further, partially frozen product is selectively returned from the chamber 12 to the storage supply 15 through the line 20 to cool the storage supply 15 by comingling of the product therewith. The method further includes separately transferring liquid from the storage supply 15 to the chamber 12 through the line 17 to replenish the product that is returned through the line 20 and any that may be dispensed through the valve 13. The chamber 12 is thus continually hydrostatically pressurized through a portion of the storage supply that is disposed between the outlet of the pump 25 and the freezing chamber 12, and such hydrostatic pressurizing of the freezing chamber 12 is maintained at a constant pressure for any level of liquid in the storage supply by the standpipe 28 having the restricted upper end 29. The temperature of the stored liquid is sensed at 27 and as a function of such temperature, the returning of partially frozen product to the storage supply 15 is controlled through the valve 22. The head pressure in the chamber 12 is continually hydrostatically augmented through the portion of the storage supply that is being continually circulated within the storage supply.

Although various minor modifications might be suggested by those versed in the art, it should be understood that I wish to embody within the scope of the patent warranted herein, all such embodiments as reasonably and properly come within the scope of my contribution to the art.

I claim as my invention:

1. A device for refrigerating a liquid and for dispensing it as an edible or potable product, comprising:
   a. means having a freezing chamber for partially freezing the liquid;
   b. a dispensing valve connected to said means in communication with said freezing chamber;
   c. a separate supply vat having a liquid storage chamber;
   d. a filling line connecting a first point in said storage chamber to a first point in said freezing chamber, and arranged to keep said freezing chamber full of liquid;
   e. a return line connecting a second point in said freezing chamber to a second point in said storage chamber for returning some refrigerated liquid to said separate supply vat to cool liquid therein; and
   f. a valve in said return line for blocking liquid return and hence limiting cooling in said supply vat.

2. A device according to claim 1 including a pump having an inlet connected to receive liquid from said first point in said storage chamber and an outlet connected to discharge into said filling line.

3. A device according to claim 2 including a standpipe having a lower end connected to said pump outlet and an upper end disposed to discharge liquid within said storage chamber and to provide a back pressure at said pump outlet.

4. A device according to claim 3 in which said upper end of said standpipe is partially restricted so that the pressure in said filling line is constant for any level of liquid in said storage chamber.

5. A device according to claim 4 including means responsive to the temperature of the stored liquid for controlling said valve in said return.

6. A device according to claim 1 including means responsive to temperature of the stored liquid for controlling said valve in said return line.

7. A device according to claim 1 in which said valve is a flexible tube arranged to be normally pinched flat at a point intermediate its ends under the control of a solenoid actuator.

8. A device according to claim 7 in which said tube is elastomeric.

9. A device according to claim 3 including a cover on said supply vat, the liquid discharging from said standpipe being so directed as not to engage said cover.

10. A device according to claim 3 in which said standpipe is an upward extension of a portion of said filling line.

11. A device according to claim 1 in which said storage chamber is above said freezing chamber for enabling liquid in said storage chamber to apply a head pressure to said freezing chamber, a pump arranged to circulate liquid in said storage chamber and also having its outlet connected to said filling line, and means applying a back pressure to the outlet of said pump which augments said head pressure.

12. A device according to claim 6 including a pump having an inlet connected to receive liquid from said first point in said storage chamber and an outlet connected to discharge into said filling line.

13. A device according to claim 12 including a standpipe having a lower end connected to said pump outlet and an upper end disposed to discharge liquid within said storage chamber and to provide a back pressure at said pump outlet.

14. A device according to claim 12 in which the temperature of the stored liquid is sensed adjacent to the outlet of said pump.

15. A method for refrigerating a liquid and for dispensing it as an edible or potable product, comprising:
   a. partially freezing a quantity of the liquid in a chamber;
   b. in accordance with demand, dispensing partially frozen product from the chamber;
   c. providing a storage supply of the unfrozen liquid;
   d. controlling the temperature of the stored liquid by selectively returning partially frozen product from the chamber to the storage supply of unfrozen liquid to cool it by comingling; and
   e. separately transferring unfrozen liquid from the storage supply to the chamber to replenish the returned product and any dispensed product.

16. A method according to claim 15 including the step of continually hydrostatically pressurizing the chamber through a recirculated portion of the storage supply.

17. A method according to claim 16 including the step of maintaining the hydrostatic pressurizing of the chamber at a constant pressure for any level of liquid in the storage supply.

18. A method according to claim 17 including sensing the temperature of the stored liquid, and as a function thereof, regulating the returning of partially frozen product to the storage supply.

19. A method according to claim 15 including sensing the temperature of the stored liquid, and as a function thereof, regulating the returning of partially frozen product to the storage supply.

20. A method according to claim 15 in which the storage supply is above the chamber so as to apply a head pressure thereto, and continually hydrostatically augmenting said head pressure through a portion of the storage supply that is continually being circulated within the storage supply.

* * * * *